United States Patent
Millner et al.

(10) Patent No.: US 9,222,042 B2
(45) Date of Patent: Dec. 29, 2015

(54) PROCESS FOR REGULATING JOULE VALUE OF OFFGASES FROM PLANTS FOR PIG IRON PRODUCTION OR OF SYNTHESIS GAS

(75) Inventors: Robert Millner, Loosdorf (AT); Jan-Friedemann Plaul, Linz (AT)

(73) Assignee: PRIMETALS TECHNOLOGIES AUSTRIA GmBH, Linz (AU)

( * ) Notice: Subject to any disclaimer, the term of this patent is extended or adjusted under 35 U.S.C. 154(b) by 170 days.

(21) Appl. No.: 14/005,766

(22) PCT Filed: Aug. 3, 2012

(86) PCT No.: PCT/EP2012/053979
§ 371 (c)(1),
(2), (4) Date: Sep. 17, 2013

(87) PCT Pub. No.: WO2012/123322
PCT Pub. Date: Sep. 20, 2012

(65) Prior Publication Data
US 2014/0007504 A1    Jan. 9, 2014

(30) Foreign Application Priority Data
Mar. 17, 2011   (AT) .................................. A 369/2011

(51) Int. Cl.
*C21B 5/06*    (2006.01)
*C21B 7/00*    (2006.01)
(Continued)

(52) U.S. Cl.
CPC ... *C10K 3/06* (2013.01); *C10J 3/46* (2013.01); *C10K 1/005* (2013.01); *C21B 5/06* (2013.01);
(Continued)

(58) Field of Classification Search
CPC .......... C21B 5/06; C21B 7/002; C21B 11/00; C21B 2100/02; C21B 2100/04; C21B 2100/06; C10K 3/06; C10K 1/005; C10J 3/46; F01K 23/068; F01K 23/10
See application file for complete search history.

(56) References Cited

U.S. PATENT DOCUMENTS

| 4,861,369 A | 8/1989 | von Bogdandy et al. |
| 7,396,228 B2 | 7/2008 | Tanabe et al. |

(Continued)

FOREIGN PATENT DOCUMENTS

| AT | 507 525 | 5/2010 |
| AT | 507 823 | 8/2010 |

(Continued)

OTHER PUBLICATIONS

International Search Report for PCT/EP2012/053979; mailed May 22, 2012.

*Primary Examiner* — George Wyszomierski
*Assistant Examiner* — Tima M McGuthry Banks
(74) *Attorney, Agent, or Firm* — Staas & Halsey LLP

(57) ABSTRACT

In a plant having integrated $CO_2$ removal, for pig iron production or synthesizing gas, at least part of the offgas or synthesis gas is discharged as export gas from the plant, optionally collected in an export gas container and subsequently thermally utilized in a gas turbine. The offgas from the gas turbine is fed to a waste heat boiler for generation of steam. To reduce the addition of high-grade fuel gases, at least part of the tailgas from the $CO_2$ removal plant is mixed into the export gas upstream of the gas turbine as a function of the joule value of the export gas after addition of the tailgas. The proportion of tailgas is increased when the joule value of the export gas goes above a predefined maximum joule value and the proportion of tailgas is reduced when the joule value of the export gas drops below a predefined minimum joule value.

17 Claims, 3 Drawing Sheets

(51) Int. Cl.
  *C21B 11/00*  (2006.01)
  *C10K 3/06*  (2006.01)
  *C10K 1/00*  (2006.01)
  *C10J 3/46*  (2006.01)
  *F01K 23/06*  (2006.01)
  *F01K 23/10*  (2006.01)

(52) U.S. Cl.
  CPC .............. *C21B 7/002* (2013.01); *F01K 23/068* (2013.01); *F01K 23/10* (2013.01); *C10J 2300/165* (2013.01); *C10J 2300/1653* (2013.01); *C21B 2100/02* (2013.01); *C21B 2100/04* (2013.01); *C21B 2100/06* (2013.01); *Y02E 20/16* (2013.01); *Y02E 20/18* (2013.01)

(56) References Cited

U.S. PATENT DOCUMENTS

| | | | |
|---|---|---|---|
| 2006/0234171 A1 | 10/2006 | Tanabe et al. | |
| 2010/0146982 A1 | 6/2010 | Lanyi et al. | |
| 2010/0264374 A1* | 10/2010 | Metius et al. | 252/373 |
| 2011/0283837 A1 | 11/2011 | Millner et al. | |
| 2012/0032378 A1* | 2/2012 | Lanyi et al. | 266/144 |
| 2012/0036961 A1 | 2/2012 | Millner | |
| 2012/0036997 A1* | 2/2012 | Millner et al. | 95/22 |
| 2014/0361472 A1* | 12/2014 | Millner et al. | 266/80 |

FOREIGN PATENT DOCUMENTS

| | | |
|---|---|---|
| AT | 507823 A1 | 8/2010 |
| AT | 507525 B1 | 9/2010 |
| AT | A369/2011 | 3/2011 |
| CN | 87108012 A | 9/1988 |
| CN | 1093411 A | 10/1994 |
| CN | 1854609 A | 11/2006 |
| CN | 102378818 A | 3/2012 |
| GB | 2281311 A | 3/1995 |
| JP | 2004-225117 | 8/2004 |

* cited by examiner

PROCESS FOR REGULATING JOULE VALUE OF OFFGASES FROM PLANTS FOR PIG IRON PRODUCTION OR OF SYNTHESIS GAS

CROSS REFERENCE TO RELATED APPLICATIONS

This application is the U.S. national stage of International Application No. PCT/EP2012/053979, filed Mar. 8, 2012 and claims the benefit thereof. The International Application claims the benefit of Austrian Application No. A369/2011 filed on Mar. 17, 2011, both applications are incorporated by reference herein in their entirety.

BACKGROUND

Described below is a process for regulating the joule value of offgases from pig iron production plants having integrated $CO_2$ removal plants, wherein at least one part of the offgas is discharged from the pig iron production plant as export gas, if necessary collected in an export gas container and subsequently thermally utilized in a gas turbine, wherein the offgas from the gas turbine is supplied to a waste heat boiler for the generation of steam. The process can equally be utilized for regulating the joule value of synthesis gas from plants for synthesis gas production having integrated $CO_2$ removal plants, wherein at least one part of the synthesis gas is discharged from the plant for synthesis gas production as export gas, not, however, collected in an export gas container, but subsequently thermally utilized in a gas turbine, wherein the offgas from the gas turbine is supplied to a waste heat boiler for the generation of steam. Also described below is a plant for carrying out the process.

There are fundamentally two known common methods for the production of pig iron, which should also include the production of pig iron products: the blast furnace process and the smelting reduction process.

During the blast furnace process, firstly pig iron is produced from iron ore by coke. Furthermore, iron scrap can additionally be used. Then steel is produced from pig iron through further processes. The iron ore is mixed as lump ore, pellets or sinter together with the reducing agent (mostly coke, or also coal, e.g. in the form of a fine coal injection plant) and further components (limestone, slag formers, etc.) with the so-called burdens and subsequently charged into the blast furnace. The blast furnace is a metallurgical reactor, in which the batch column reacts in the counter flow with hot air, the so-called hot blast. By burning the carbon from the coke, the heat and carbon monoxide or hydrogen necessary for the reaction are produced, the hydrogen representing a significant part of the reduction gas and flowing through the batch column and reducing the iron ore. As a result, pig iron and slag are produced, which are periodically tapped off.

In the so-called oxygen blast furnace, which is also identified as a blast furnace having top gas or furnace gas recirculation, oxygenated gas with a proportion of oxygen ($O_2$) of more than 90% by volume is blown into the blast furnace, during the gasification of coke or coal.

A gas purification (e.g. dust separator and/or cyclones combined with wet scrubbers, bag filter units or hot gas filters) must be provided for the gas emitted from the blast furnace, the so-called top gas or furnace gas. Furthermore, most of the time in the oxygen blast furnace, a compressor, which may have an after-cooler, is provided for the top gas, which is recirculated in the blast furnace, as well as a device for removing $CO_2$, mostly by pressure swing adsorption, as known in the related art.

Further options for the embodiment of a blast furnace process are a heater for the reduction gas and/or a combustion chamber for the partial combustion with oxygen.

The disadvantages of the blast furnace are the demands on the input materials and the high emissions of carbon dioxide. The iron source and the coke which is used must be hard and in lumps, such that enough cavities remain in the batch column, which guarantee that the wind, which is blown in, flows through. The $CO_2$ emissions represent a strong environmental burden. Therefore there are efforts to remove the blast furnace route. To be noted here are the sponge iron production based on natural gas (MIDREZ, HYL, FINMET®) as well as the smelting reduction processes (COREX® and FINEX® processes).

A smelter gasifier is used during the smelting reduction process, in which hot liquid metal is produced, as well as at least one reduction reactor, in which the source of the iron ore (lump ore, fine ore, pellets, sinter) is reduced with reduction gas, wherein the reduction gas is generated in the smelter gasifier by gasification of coal (and, if necessary, of a small proportion of coke) with oxygen (90% or more).

As a rule, during the smelting reduction process
- gas purification plants (on the one hand for the top gas from the reduction reactor, on the other hand for the reduction gas from the smelter gasifier),
- a compressor, which may have an after-cooler, for the reduction gas, which is recirculated in the reduction reactor,
- a device for removing $CO_2$, mostly by pressure swing adsorption, as known in the related art
- as well as, optionally, a heater for the reduction gas and/or a combustion chamber for the partial combustion with oxygen are also provided.

The COREX® process is a two-step smelting reduction process. The smelting reduction process combines the process of the direct reduction (pre-reduction of iron to sponge iron) with a smelting process (main reduction).

The equally well-known FINEX® process corresponds significantly to the COREX® process, however iron ore is introduced as fine ore.

The process is not only able to be used in pig iron generation, but also in synthesis gas plants. Synthesis gases are all gaseous mixtures containing hydrogen and mostly also containing CO, which should be used in a synthesis reaction. Synthesis gases can also be produced from solid, liquid or gaseous substances. In particular these include the coal gasification (coal is transformed with water vapor and/or oxygen to hydrogen and CO) and the production of synthesis gas from natural gas (transformation of methane with hydrogen and/or oxygen to hydrogen and CO). Beneficially, in the case of the coal gasification, the export gas storage, as is provided according to pig iron production plants, can be omitted, because the high synthesis gas pressure from the gasifier (mostly >20 $bar_g$, such as approximately 40 $bar_g$) can also equally be used in the gas turbine, where, as a rule, a gas pressure of approximately 20-25 $bar_g$ is needed. The tail gas, which is rich in $CO_2$, from the $CO_2$ removal plant must, however, be compressed to the pressure of the synthesis gas flow by a compressor.

If the $CO_2$ emissions into the atmosphere are to be reduced in the production of pig iron or in the generation of synthesis gas, these must be removed from the offgases from the pig iron or synthesis gas production and captured in a combined form ($CO_2$ capture and sequestration (CCS)).

Until now the pressure swing adsorption (PSA), in particular also the vacuum pressure swing adsorption (VPSA), has principally been used to remove $CO_2$. The pressure swing adsorption is a physical process for the selective deconstruction of gaseous mixtures under pressure. Special porous materials (e.g. zeolite, activated carbon, activated silicon oxide ($SiO_2$), activated aluminum oxide ($Al_2O_3$) or the combined use of these materials) are used as a molecular sieve, in order to adsorb molecules according to their adsorption strengths and/or their kinetic diameter. During PSA, the fact that gases adsorb at various strengths to the surface is used. The gaseous mixture is introduced into a column under an exactly defined pressure. Now the undesirable components (here $CO_2$ and $H_2O$) and the recyclable material (here CO, $H_2$ $CH_4$) flow through the column, to a great extent unobstructed. As soon as the adsorbent is completely loaded, the pressure is reduced and the column is backwashed. An electric current for the preceding compression of the gas, which is recirculated and is rich in $CO_2$, is needed to operate a (V)PSA plant.

The product gas flow after the pressure swing adsorption, which contains the recyclable material, still contains, for example, 2-6% by volume $CO_2$ in the offgases from the pig iron generation. The tail gas flow from the (V)PSA plant still, however, contains relatively high reducing gas proportions (for example CO, $H_2$), which are lost during the pig iron production.

The tail gas flow after the pressure swing adsorption, which contains the undesired components, is typically composed as follows in the offgases from the pig iron production:

| Combination | % by vol during VPSA | % by vol during PSA |
|---|---|---|
| $H_2$ | 2.2 | 5.5 |
| $N_2$ | 1.5 | 2.4 |
| CO | 10.9 | 16.8 |
| $CO_2$ | 82.1 | 72.2 |
| $CH_4$ | 0.7 | 0.9 |
| $H_2O$ | 2.6 | 2.2 |

The tail gas cannot simply be thermally utilized, because for that—due to the low and/or fluctuating joule values of, for example, ±50%—it would have to be augmented with other fuels. It can, for example, be added in its entirety to the so-called export gas, which is the part of the process gas, which is removed from the process of the pig iron or synthesis gas generation and is used for other purposes, for example as a fuel in a combined gas and steam power station, which is also identified as a combined cycle power plant (CCPP). Components of the export gas in the pig iron generation can be:
  top gas and/or generator gas from a blast furnace, a reduction reactor (fluidized bed reactor) or a reduction shaft (fixed bed reactor)
  so-called offgas from a reduction reactor (fluidized bed reactor)
  so-called excess gas from a smelter gasifier The addition of tail gas from the $CO_2$ removal to the export gas is, then, only beneficial if the joule value of the export gas is so high that it does not drop under a value after the addition of the tail gas that is too low for the subsequent use of the export gas.

A reduced joule value of the export gas subsequently decreases the efficiency of a power station supplied with the export gas, for example in a combined cycle power plant, because of the high compression of gaseous fuel and because of the lower efficiency of the gas turbine. In a steam power station or furnace the flame temperature would be reduced during the combustion.

If an addition of the tail gas from the $CO_2$ removal to the export gas is not beneficial, this was until now combusted in its entirety on a hot flare. This does not only have the disadvantage that heat, which is produced during flaring, is lost, but also that considerable gas emissions in the form of carbon monoxide CO, hydrogen sulphide $H_2S$, etc., can be produced by incomplete combustion of the tail gas in the hot flare.

Another problem in using export gas from plants for the production of pig iron and synthesis gas is that the joule value of the export gas fluctuates. Therefore the export gas is captured in an export gas container having a large volume, e.g. in the size of 100,000 $m^3$, before being supplied to a consumer, such as a power station, in order to homogenize the gas composition. In order to achieve a constant joule value having a fluctuation margin of +/-1-2%, until now waste nitrogen from an air deconstruction plant was added when the joule value deviated upwards from the desired constant value. Coke oven gas (for example from the pyrolysis of hard coal to coke for the blast furnace) was added when the joule value deviated downwards.

A corresponding process for balancing the joule value is shown in AT 507 525 B1. According to this publication the export gas is supplied to a buffer unit, where the regulation of the joule value occurs, according to which the joule value is raised by the addition of smelter gas or natural gas and reduced by the addition of nitrogen or water vapor.

In AT 507 525 B1, the accumulating tail gas from a $CO_2$ removal unit is collected in a particular storage unit, wherein the joule value in the captured tail gas is balanced. The tail gas, which is captured in advance, is supplied to a waste heat boiler, where steam is generated through the combustion of the tail gas, the steam driving a steam turbine and a generator. A part of the export gas can be supplied to the tail gas in the storage unit, the export gas having passed through a top gas pressure recovery turbine.

When carrying out the combustion of the tail gas in the hot flare according to AT 507 525 B1, it is avoided, although it is disadvantageous, that high value gaseous fuel, such as smelter gas, which can be disposed of in the plant or specially provided natural gas, which is not available in the plant, is used for the regulation of the joule value of the export gas.

Therefore described below is a process to regulate the joule value of the export gas, which manages with a small addition of high value gaseous fuel.

SUMMARY

According to the method described below, at least one part of the tail gas from the $CO_2$ removal plant is added to the export gas before the gas turbine, in particular, if necessary, before the export gas container, depending on the joule value of the export gas after the addition of the tail gas, in particular after the export gas container, wherein the proportion of tail gas is increased if the joule value of the export gas rises above a predefined maximum joule value and the proportion of tail gas is lowered if the joule value of the export gas drops below a predefined minimum joule value.

As a rule a desired joule value of the export gas, which depends on the gas turbine which is used, is specified, as well as a fluctuation margin, around which the actual joule value may deviate from the desired joule value in the operation. The upper end of the fluctuation margin represents the predefined maximum joule value and the lower end the predefined minimum value. If no fluctuation margin is specified, then the minimum joule value coincides with the maximum joule value.

For the majority of the time in the operation, the joule value regulation is possible because of the quantity of tail gas added. It can also additionally be provided that the export gas, which is mixed with tail gas, passes through a buffer container before the gas turbine. In this buffer container a further gas, supplied before the buffer container, can be mixed with the mixture of export gas and tail gas.

In this way it can be provided that, additionally, when the predefined minimum joule values before the gas turbine are not reached, for example before and/or after the buffer container, gaseous fuel is added. Gaseous fuel is identified as a gas that predominantly contains combustible gas. Typical gaseous fuels are natural gas, liquefied natural gas (LNG) and coke oven gas.

If the joule value rises, it can in this way be provided that—additionally to the tail gas—non-combustible gas is added when the maximum joule value before the gas turbine is exceeded, for example before and/or after the buffer container. Non-combustible gas is identified as gas that predominantly contains non-combustible gases. Typical non-combustible gases are nitrogen or water vapor.

The part of the tail gas, which is not added to the export gas, can be supplied to the smelter gas distribution system in the case of the pig iron production. The smelter gas distribution system includes all lines for gases, which accumulate in a smelter or are produced for smelting, thus, for example, gas for drying raw material (iron ore, coal) or gas, which is supplied from the smelter as fuel to a power station with a furnace. The gas distribution system is, of course, also a component part of the smelter gas distribution network for the furnace gas, the top gas or generator gas, the offgas and the excess gas. Ideally the tail gas is added to the furnace gas, as the joule value lies in the same region (the averaged joule value lies in the region of 2,000 to 4,000 kJ/Nm$^3$). The part of the tail gas, which is not added to the export gas, can also be supplied to a hot flare.

In the case of failure or lack of receiving of the tail gas by the smelter gas distribution system, the tail gas can also be fed to the hot flare via a regulating valve.

According to the process, the export gas can contain at least one of the following offgases:
 top gas from a blast furnace, in particular from an oxygen blast furnace having top gas recirculation,
 offgas from a smelter gasifier of a smelting reduction plant, which is also identified as excess gas
 offgas from at least one reduction reactor of a smelting reduction plant, which is also identified as offgas, or from a reduction shaft
 offgas from at least one fixed bed reactor to preheat and or reduce iron oxides and/or compacted iron of a smelting reduction plant, which is also identified as top gas
 synthesis gas from a plant for synthesis gas production.

A plant for carrying out the process includes at least
 one pig iron production plant having an integrated $CO_2$ removal plant or one plant for synthesis gas production having an integrated $CO_2$ removal plant,
 one export gas line, with which a part of the offgas or synthesis gas can be discharged as export gas from the pig iron production plant or for synthesis gas production,
 if necessary, one export gas container, in which the export gas can be collected, as well as
 one gas turbine, in which the export gas can be thermally utilized,
 one waste heat boiler, in which the offgas from the gas turbine can be used for the production of steam.

The plant is characterized in that the $CO_2$ removal plant is connected to the export gas line such that at least one part of the tail gas from the $CO_2$ removal plant can be added to the export gas before the gas turbine, in particular, if necessary, before the export gas container, and such that a measuring instrument for measuring the joule value of the export gas is provided after the addition of the tail gas, in particular after the export gas container.

According to the variations in process described above, it can be provided that a buffer container is provided—if necessary after the export gas container and—before the gas turbine.

At least one supply line can be provided before and/or after the buffer container, as well as at least one supply line for non-combustible gas.

In the case of pig iron production, a line can be provided for the part of the tail gas, which is not added to the export gas, the line flowing into the smelter gas distribution system, such as into the furnace gas distribution system, or into a hot flare.

As a rule, at least one line flows into the export gas line, with which
 top gas from a blast furnace, in particular from an oxygen blast furnace with top gas recirculation,
 offgas from a smelter gasifier of a smelting reduction plant,
 offgas from at least one reduction reactor or reduction shaft of a smelting reduction plant,
 offgas from at least one fixed bed reactor for heating and/or reducing iron oxides and/or compacted iron of a smelting reduction plant,
 synthesis gas from a plant for synthesis gas production can be fed into the export gas line.

With the process or the device described below, high value gaseous fuel, such as natural gas, liquefied natural gas or coke oven gas, can be saved and at the same time the joule value of the export gas can be adjusted at the gas turbine and thus a greater efficiency of the gas turbine can be achieved. By adding the tail gas from the $CO_2$ removal plant to the export gas, less to absolutely no tail gas is flared. The energy of the tail gas can therefore, for the most part, be converted to electrical energy and the gas emissions of the hot flare due to uncombusted tail gas will be reduced or at best will be completely avoided.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
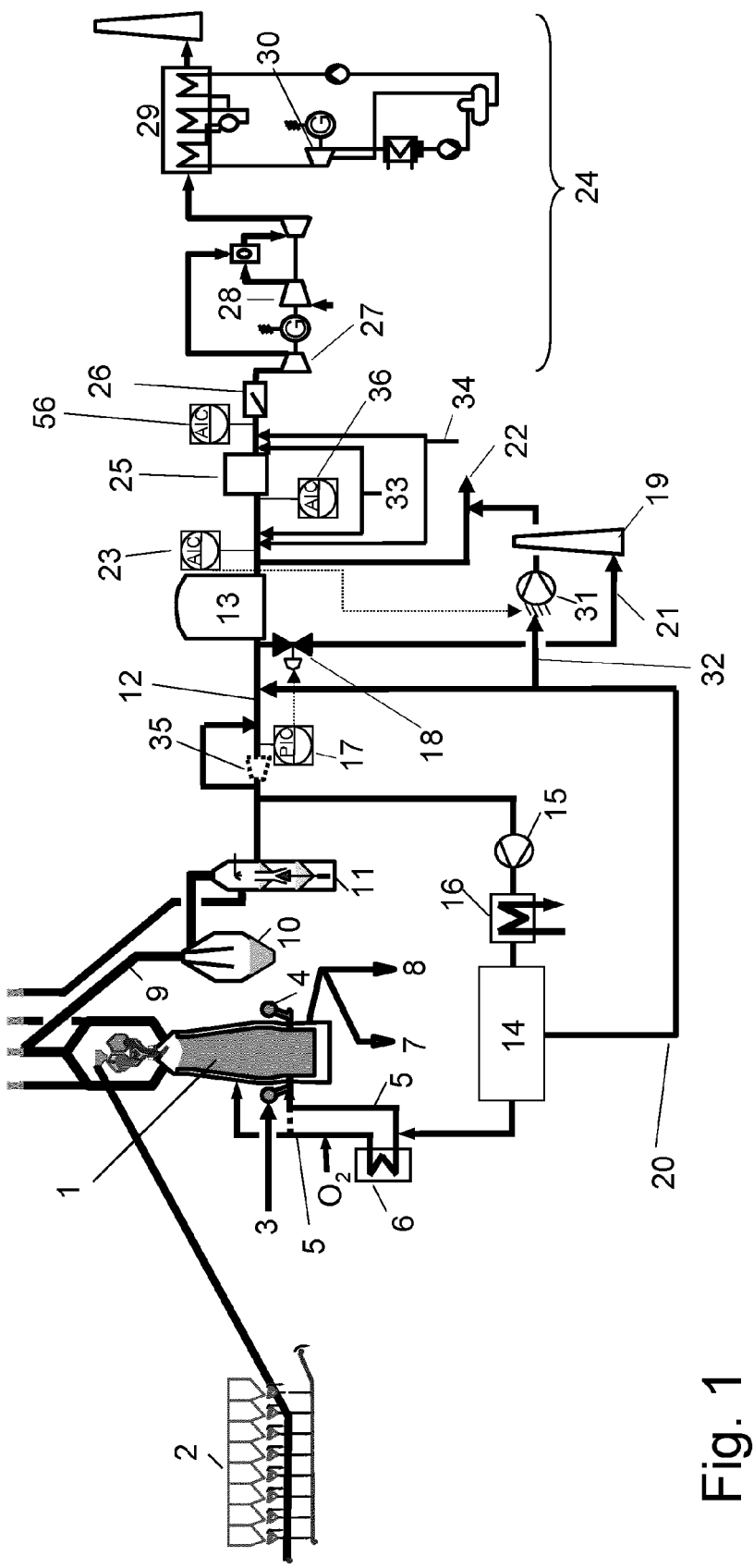
FIG. 1 is a schematic block diagram of a plant having a blast furnace.

Reference will now be made in detail to the preferred embodiments, examples of which are illustrated in the accompanying drawings, wherein like reference numerals refer to like elements throughout.

In FIG. 1 an oxygen blast furnace having top gas recirculation 1 is depicted, in which iron ore from the sinter plant 2 as well as coke (not depicted) is supplied. Gas 3, which contains oxygen and has an oxygen content >90% by volume, is introduced into the ring line 4, and, equally, heated reduction gas 5 is introduced into the reduction gas oven 6 together with cold or pre-heated oxygen $O_2$ in the blast furnace 1. Slag 7 and pig iron 8 are removed from below. On the upper side of the blast furnace 1 the top gas or furnace gas 9 is extracted and is pre-treated in a dust separator or cyclone 10 and purified once again in a wet scrubber 11 (or a bag filter or hot gas filter system). The top or furnace gas, which is purified in this way, can on the one hand be extracted directly as export gas 12 from the blast furnace system and supplied to an export gas container 13. On the other hand it can be supplied to a $CO_2$ removal plant, which is carried out here as a plant for the pressure swing adsorption of $CO_2$, identified in short as a PSA plant 14, wherein the purified top or furnace gas is compressed beforehand in a compressor 15 to, for example, 2-6 $bar_g$ and is cooled in an after-cooler 16 to, for example, 30-60° C.

The PSA plant 14 is known in the related art as used for $CO_2$ removal and sequestration and therefore does not have to be further illustrated here.

Here, the tail gas 20 is may be at least partially supplied to the export gas 12 before the export gas container 13 and is mixed with it. In the case of an adsorption plant for the removal of $CO_2$—completely or partially—it could either be released back into the atmosphere after a $H_2S$ purification and/or supplied to a further compressor to liquefy $CO_2$, in order to then transport it and store it, for example underground, or in order to use it as a replacement for nitrogen in the iron production. In the case of a (V)PSA for the removal of $CO_2$ and a sequestration, a further preparation plant is normally required to concentrate the $CO_2$ flow.

The pressure energy content of the export gas 12 can also be used in a top gas pressure recovery turbine 35, which in this example is arranged before the export gas container 13 and the supply line for the tail gas 20. A corresponding diversion for the export gas 12 around the top gas pressure recovery turbine 35 is provided, in case the export gas 12 — for example in the case of a maintenance shut down of the top gas pressure recovery turbine —should not be fed through the top gas pressure recovery turbine 35. The pressure of the export gas 12 is measured with a pressure gauge 17 after the top gas pressure recovery turbine 35 and before the supply line for the tail gas 20 and, depending on the measured pressure or on the level in the export gas container, a valve 18 in the line 21 for the export gas to the hot flare 19 is actuated: if the pressure of the export gas 12 or the level in the export gas container exceeds a predefined value, then at least a part of it is fed to a furnace gas distribution system or a hot flare 19 and, in the latter case, combusted there. The rest continues into the export gas container 13.

The export gas from the export gas container 13 is supplied to a combined cycle power plant 24 as a fuel, optionally via a buffer container 25 and optionally via a filter 26. The export gas is supplied to a gaseous fuel compressor 27 and then to a gas turbine 28. The waste heat from the gas turbine is used in the waste heat boiler 29 for a steam circulation with a steam turbine 30.

Export gas 22 that is not needed for the combined cycle power plant 24 can be removed after the export gas container 13 and supplied to the smelter gas distribution network 75, where it can be used for other purposes, for example for drying raw materials (drying coal, fine coal or ore) or it can be used as fuel for thermal use (e.g. steam power stations, boilers, etc.). The extraction of export gas 22 that is not needed can be carried out via a regulating valve, which is not depicted here, in the line for the export gas 22 that is not needed.

A first measuring instrument 23 for measuring joule value is provided after the export gas container 13 and after the extraction line of the export gas 22 that is not needed. Depending on the measured value thereof, a fan 31 is regulated, which is arranged in a line 32 for tail gas. This line 32 branches off from the line for tail gas 20 before this flows into the line for export gas 12 and leads to the line for the export gas 22 that is not needed. If the joule value of the export gas rises above a predefined maximum joule value, then the power of the fan 31 is reduced, such that less tail gas is sucked into the line 32 and thus less tail gas reaches the export gas 22 that is not needed. Therefore more tail gas reaches the export gas container 13 and the joule value of the export gas drops.

Instead of the fan 31, a regulating valve can also simply be used, which is regulated because of the measured value of the first measuring instrument 23 for measuring the joule value and which increases the supply of tail gas 20 to the export gas 12 and thus in the export gas container 13.

If, however, the joule value of the export gas drops below a predefined minimum joule value, then the power of the fan 31 is increased (or a corresponding regulating valve is completely or partially opened), such that more tail gas is sucked or fed into the line 32 and thus more tail gas reaches the export gas 22 that is not needed. Therefore less tail gas reaches the export gas container 13 and the joule value of the export gas increases.

In emergencies, a regulating valve, which is not depicted here, can also be opened, which introduces the tail gas into the hot flare 19 for combustion.

The pressure at the foot of the hot flare 19 is smaller than approximately 5 $kPa_g$. In turn, this pressure is smaller than the pressure of the export gas 12, which as a rule lies between 8 and 12 $kPa_g$, wherein the pressure is lowered to a pressure of 7-9 $kPa_g$ in the export gas container 13 because of pipe line pressure loss to the extent of, for example, 1-3 $kPa_g$.

As the line system, including that for the tail gas 20 as well as the line 32, remains connected to the line system for the export gas 12 during the entire operation, the desorption pressure for the PSA plant 14 also does not change. Thus there is no worsening in the operation of the PSA plant 14 due to the process described herein.

As the regulation of the joule value by the fan 31 or the regulating valve for the tail gas does not always have to be sufficient, a further buffer container 25 is, if necessary, additionally arranged after the export gas container 13 and after the first measuring instrument 23 for measuring joule value, in which buffer container 25 the export gas 12, which is, if necessary, already mixed with the tail gas 20, can be mixed with further gases. Hereto a supply line 33 for gaseous fuel (e.g. natural gas, liquefied natural gas, coke oven gas) as well as a supply line 34 for non-combustible gas 34 (e.g. nitrogen, like waste nitrogen from an air deconstruction plant, or water vapor) are arranged between the first measuring instrument 23 for measuring joule value and the buffer container 25. With these supply lines gaseous fuels can now be added, in the case that the joule value cannot be raised above the predefined minimum joule value even without the addition of the tail gas. Analogically, non-combustible gas can be added, if the joule value cannot drop below the predetermined maximum value even with the addition of the entire tail gas.

A second measuring instrument 36 for measuring joule value is provided after both of these supply lines, however before the buffer container 25. This controls whether the joule value can be adjusted between a predefined minimum and maximum joule value through the supply lines 33, 34 lying before it. In the case that it cannot, gaseous fuel or non-combustible gas can be once again added by supply lines 33, 34, which are arranged after the buffer container 25. The joule value, which is achieved in this way, is calculated with a third measuring instrument 56 for measuring joule value. This measuring instrument 56 is provided after the supply lines 33, 34, which are arranged after the buffer container 25 and before the gas compressor 27 and here also before the filter 26.

The typical joule value of the tail gas from a PSA plant 14 lies at 700-900 kcal/Nm$^3$ and the joule value of the offgas from a FINEX® plant, which is removed as export gas 12, lies at 1300-1800 kcal/Nm$^3$. The joule value needed for the gas turbine 28 lies in the region of the joule value of the export gas and the typical, permissible fluctuation margin of the joule value for 1300 kcal/Nm$^3$ lies at +/−20 kcal/Nm$^3$. In this case the predefined minimum joule value would amount to 1280 kcal/Nm$^3$ and the predefined maximum joule value to 1320 kcal/Nm$^3$. The joule value needed for the gas turbine 28 depends on the type of gas turbine.

The export gas mixed with tail gas is purified as a precaution before the gas turbine 27 and, if necessary, after the buffer container 25 in a separator 26 for solids.

Figure 2:
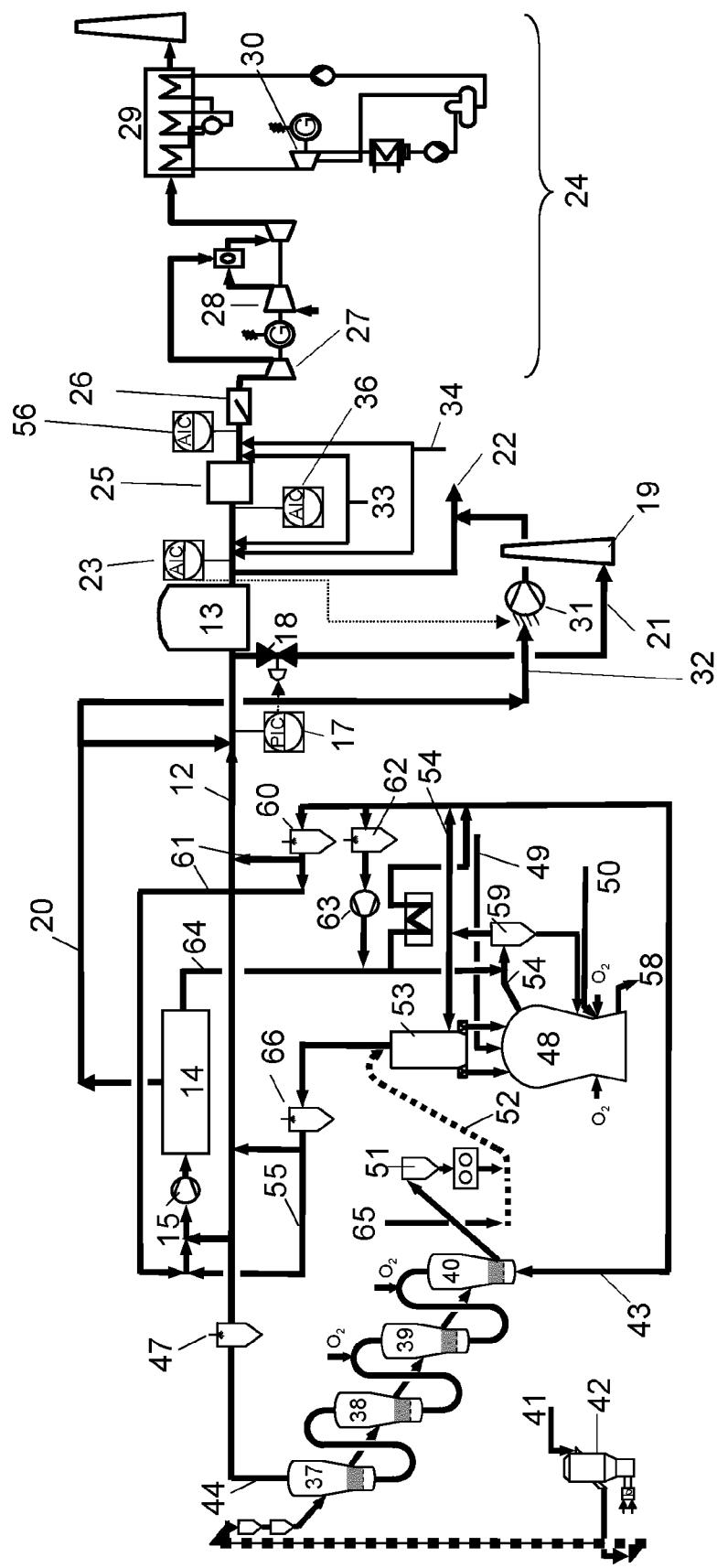
FIG. 2 is a schematic block diagram of a plant having a FINEX® plant.

FIG. 2 shows a connection between a FINEX® plant, on the one hand, and a combined cycle power plant 24 together with upstream export gas containers 13, on the other hand, wherein the latter are constructed exactly the same as those in FIG. 1.

The power station 24 is supplied with export gas 12 by a FINEX® plant, which can be temporarily stored in an export gas container 13. Export gas 22 that is not needed for the power station 24 can again be supplied to the smelter gas distribution network, for example to drying raw material.

In this example, the FINEX® plant has four reduction reactors 37-40, which are formed as fluidized bed reactors and are loaded with fine ore. Fine ore and additives 41 are supplied for drying the ore 42 and, from there, firstly to the fourth reactor 37, then they reach the third 38, the second 39 and finally the first reduction reactor 40. Instead of four fluidized bed reactors 37-40, there could also be only 3 present.

The reduction gas 43 is led in the counter flow to the fine ore. It is introduced at the floor of the first reduction reactor 40 and is emitted from the upper side thereof. Before it enters the second reduction reactor 39 from below, it can be further heated with oxygen O$_2$, as well as between the second 39 and third 38 reduction reactors.

The offgas 44 from the reduction reactors is purified in a wet scrubber 47 and further used as export gas 12 in the downstream combined cycle power plant 24, as described above.

The reduction gas 43 is produced in a smelter gasifier 48, in which on the one hand coal in the form of lumps of coal 49 and of coal in powder form 50—this together with oxygen O$_2$—is supplied, in which, on the other hand, the iron ore is added, which is pre-reduced in the reduction reactors 37-40 and formed into hot compacted iron (HCI) in the iron compacting 51. In the process, the compacted iron reach a storage container 53 via a conveyer system 52, which is formed as a fixed bed reactor, where the compacted iron is, if necessary, preheated and reduced with roughly purified generator gas 54 from the smelter gasifier 48. Here, cold compacted iron 65 can be added. Subsequently, the compacted iron or iron oxides are charged from above in the smelter gasifier 48. Low reduced iron (LRI) can equally be removed from the iron compacting 51.

The coal in the smelter gasifier 48 is gasified, which produces a gas mixture which is mainly CO and H$_2$, and is removed as a reduction gas (generator gas) 54 and partial flow is supplied to the reduction reactors 37-40 as a reduction gas 43. The hot metal, which is smelted in the smelter gasifier 48, and the slag are removed, see arrow 58.

The generator gas 54, which is removed from the smelter gasifier 48, is firstly led into a separator 59, in order to be removed with delivered dust and in order to recirculate the dust in the smelter gasifier 48 via dust burners. A part of the generator gas purified by rough dust is further purified by a wet scrubber 60 and extracted as excess gas 61 from the FINEX® plant. A part can also be supplied to the PSA plant 14.

A further part of the purified generator gas 54 is equally further purified in a wet scrubber 62, supplied to a gas compressor 63 for cooling and then supplied again to the generator gas 54 for cooling after the smelter gasifier 48, after being mixed with the product gas 64, which is extracted from the PSA plant 14 and rid of CO$_2$. Through this recirculation of the gas 64, rid of CO$_2$, the reducing components, which are contained therein, can still be used for the FINEX® process and, on the other hand, the required cooling of the hot generator gas 54 from around 1050° C. to 700-870° C. can be ensured.

The top gas 55 emitted from the storage plant 53, where the compacted iron or iron oxides are heated and reduced with de-dusted and cooled generator gas 54 from the smelter gasifier 48, is purified in a wet scrubber 66 and then equally at least partially supplied to the PSA plant 14 for the removal of CO$_2$ and at least partially added to the offgas 44 from the reduction reactors 37-40. The gas supply line to the storage plant 53 can also be omitted.

A part of the offgas 44 from the reduction reactors 37-40 can also be added directly to the PSA plant 14. The gases, which are supplied to the PSA plant 14 are compressed beforehand in a compressor 15.

The tail gas 20 from the PSA plant 14 can be added completely or partially to the export gas 12 or added to the smelter gas distribution network via the export gas 22 that is not needed, or supplied to the hot flare 19 for combustion, as has already been described in FIG. 1. The construction and function of the plant from the export gas container 13 onwards are equally covered by that of FIG. 1.

Figure 3:
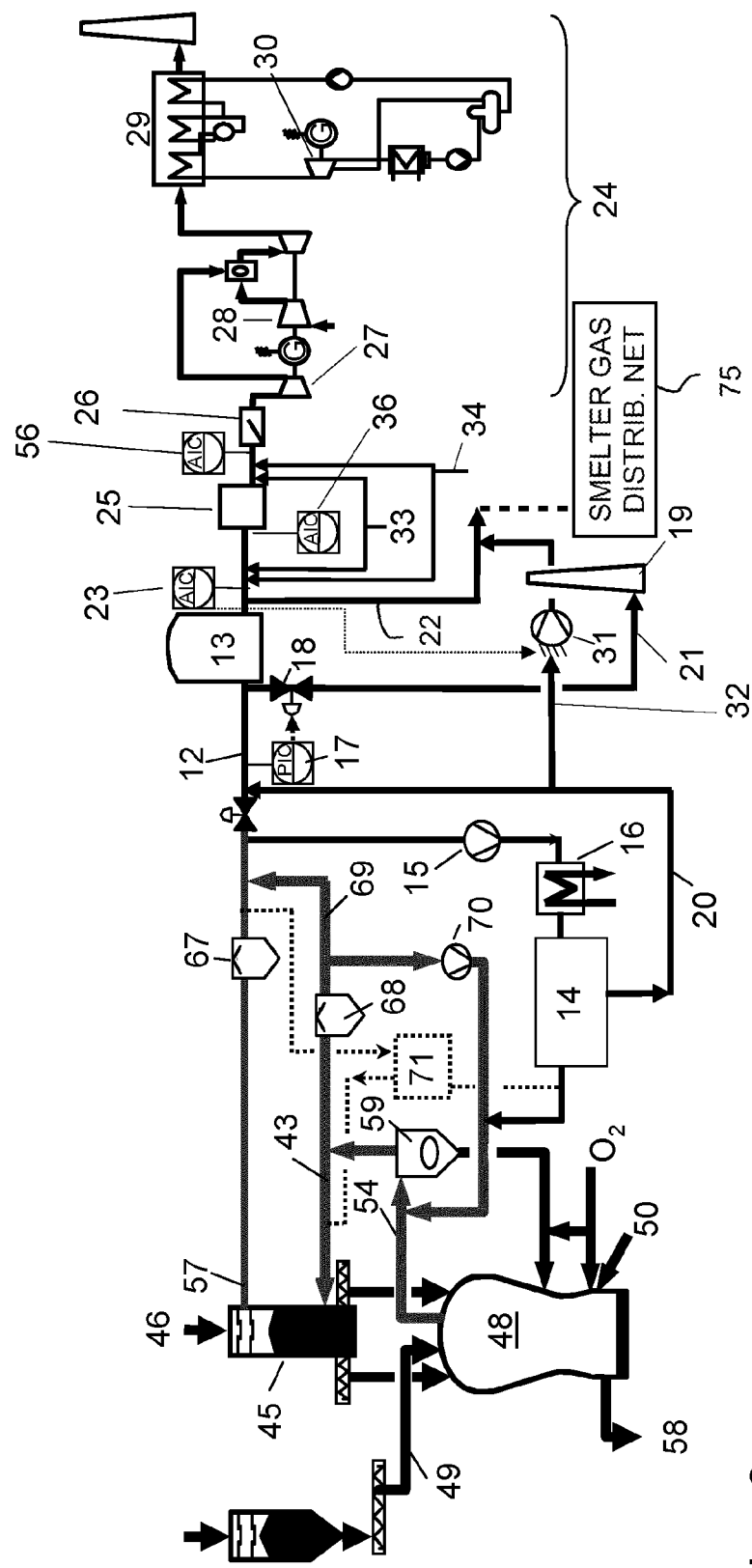
FIG. 3 is a schematic block diagram of a plant having a COREX® plant.

FIG. 3 shows the connection between a plant for smelting reduction on the one hand, and an export gas container 13 with a combined cycle power plant 24 on the other hand, wherein the latter are constructed exactly the same as those in FIG. 1.

The power station 24 is supplied with export gas 12 by a COREX® plant, the export gas 22 being able to be temporarily stored in an export gas container 13. Export gas 22 that is not needed for the power station 24, can be once again supplied to the smelter gas distribution network, for example, for drying raw materials.

In this example, the COREX® plant has a reduction shaft 45, which is formed as a fixed bed reactor and is loaded with lump ore, pellets, sinter and additives, see reference sign 46. The reduction gas 43 is led in the counter flow to the lump ore 46 etc. It is introduced at the floor of the reduction shaft 45 and emitted at the upper side thereof as top gas 57. The top gas 57 from the reduction shaft 45 is further purified in a wet scrubber 67 and a part is extracted from the COREX® plant as export gas 12 and a part is rid of CO$_2$ and supplied once again to the reduction shaft 45 via the PSA plant situated in the COREX® plant.

The reduction gas 43 for the reduction shaft 45 is produced in a smelting gasifier 48, into which, on the one hand, coal in the form of lumps of coal 49 and coal in powder form 50—this together with oxygen O$_2$—is supplied, into which, on the other hand, the iron ore, which is pre-reduced in the reduction shaft 45, is added.

The coal in the smelter gasifier 48 is gasified, which produces a gas mixture, which is mainly CO and $H_2$, and is removed as top gas (generator gas) 54, and a partial stream is supplied to the reduction shaft 45 as reduction gas 43. The hot metal smelted in the smelter gasifier 48 and the slag are removed, see arrow 58.

The generator gas 54, which is removed from the smelter gasifier 48, is led into a separator 59, in order to be removed with delivered dust and in order to recirculate the dust in the smelter gasifier 48 via a dust burner.

A part of the top gas 54, which is purified by rough dust, is further purified by a wet scrubber 68 and extracted as excess gas 69 from the COREX® plant and added to the top gas 57 or to the export gas 12.

A part of the purified top or generator gas 54 after the wet scrubber 68 is supplied to a gas compressor 70 for cooling and then further supplied to the top or generator gas 54 after the smelter gasifier 48 for cooling. Through this recirculation the reducing components contained therein can still be used for the COREX® process and, on the other hand, the required cooling of the hot top or generator gas 54 from approx. 1050° C. to 700-900° C. can be ensured.

A part of the top gas 57, which can also contain excess gas 69, is compressed by a compressor 15 and cooled in an after-cooler 16, before it is supplied to the PSA plant 14. The product gas from the PSA plant 14, which is rid of $CO_2$, is at least partially supplied to the cooled gas after the wet scrubber 68 and therefore again to the generator gas 54.

The product gas from the PSA plant 14, which is rid of $CO_2$, can, if necessary, also be partially heated in a heating unit 71 and added to the reduction gas 43, and after the addition of generator gas 54. A part of the top gas 57 can, however, also be heated in the heating unit 71 and then added to the reduction gas 43.

Here, the tail gas 20 is again at least partially supplied to the export gas 12 before the export gas container 13 and mixed with this. It could also—completely or partially—either be released once more into the atmosphere after a $H_2S$ purification and/or can be supplied to a further compressor to liquefy $CO_2$, in order to then transport it and to store it, for example underground, or in order to use it as a replacement for nitrogen in the iron production.

The pressure of the export gas 12 after the supply line for tail gas 20 is measured with a pressure gauge 17 and a valve 18 in the line 21 for export gas to the hot flare 19 is actuated depending on the measured pressure or on the level of the export gas storage: if the pressure of the export gas 12 exceeds a predefined pressure or a predefined level in the export gas storage, then at least a part thereof is led to the hot flare 19 and combusted there, and the rest continues into the export gas container 13.

The export gas from the export gas container 13 is supplied to a combined cycle power plant 24 as fuel, and optionally via a buffer container 25 and optionally via a filter 26. The export gas is supplied to a gaseous fuel compressor 27 and then to the gas turbine 28. The waste heat from the gas turbine is used in the waste heat boiler 29 for a steam circulation with a steam turbine 30.

The plant and the function of the plant according to FIG. 3 after the removal of the export gas from the COREX® plant are the same as those from FIG. 1.

In FIG. 3 a regulating valve 72 is additionally provided for export gas 12, with which the quantity of export gas 12, which is extracted from the COREX® plant, can be regulated.

If the process is used on the synthesis gas of a plant for synthesis gas production, this takes the place of the plant for iron production in the exemplary embodiments above. At least a part of the synthesis gas then forms the export gas, for which no export gas container 13 is provided and the joule value of which is regulated by adding tail gas from a $CO_2$ removal plant situated in the plant for synthesis gas production. The corresponding plant, having supply lines 33, 34 for gaseous fuel and non-combustible gas and having a power station 24, is then the same for the synthesis gas as that from the FIGS. 1-3. The $CO_2$ rich tail gas from the $CO_2$ removal plant must be compressed to the export gas pressure (=synthesis gas pressure) by a compressor for the addition to the export gas.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for regulating a joule value of offgases from plants having integrated $CO_2$ removal, where at least one part of pig iron production offgas or synthesis gas from synthesis gas production is discharged as export gas that is subsequently thermally utilized in a gas turbine and offgas from the gas turbine is supplied to a waste heat boiler for generating steam, said method comprising:
   adding at least one part of tail gas from the $CO_2$ removal to the export gas before the gas turbine, based on the joule value of the export gas after the addition of the tail gas, to increase a proportion of tail gas, if the joule value of the export gas rises above a predefined maximum joule value, and to reduce the proportion of tail gas, if the joule value of the export gas drops below a predefined minimum joule value.

2. The method as claimed in claim 1,
   wherein the export gas is collected in an export gas container upstream of the gas turbine, and
   wherein the tail gas is added to the export gas upstream of the export gas container.

3. The method as claimed in claim 1, wherein the export gas mixed with the tail gas flows through a buffer container before the gas turbine.

4. The method as claimed in claim 3, further comprising adding gaseous fuel when the predefined minimum joule value is not reached before the gas turbine, at least one of before the buffer container and after the buffer container.

5. The method as claimed in claim 3, further comprising adding non-combustible gas when the predefined maximum joule value before the gas turbine is exceeded, at least one of before the buffer container and after the buffer container.

6. The method as claimed in claim 5,
   wherein the export gas is pig iron production offgas, and
   wherein the method further comprises supplying a remaining part of the tail gas, not added to the export gas, to one of a smelter gas distribution network and a hot flare.

7. The method as claimed in claim 6, wherein the remaining part of the tail gas is supplied to a furnace gas distribution network.

8. The method as claimed in claim 5, wherein the export gas contains at least one of:
   top gas from an oxygen blast furnace having top gas recirculation,
   smelter gasifier offgas from a smelter gasifier of a smelting reduction plant,
   reduction offgas from at least one of a reduction reactor and a reduction shaft of the smelting reduction plant, reactor offgas from at least one fixed bed reactor to at least one of heat and reduce at least one of iron oxides and compacted iron of the smelting reduction plant, and the synthesis gas from a synthesis gas production plant.

9. A plant, comprising:
one of a pig iron production plant and a synthesis gas production plant, with an integrated $CO_2$ sequestration plant;
at least one export gas line discharging a part of pig iron production offgas or synthesis gas as export gas from the pig iron production plant or for synthesis gas production, respectively;
a gas turbine thermally utilizing the export gas;
a waste heat boiler utilizing offgas from the gas turbine for generation of steam;
a measuring instrument measuring a joule value of the export gas; and
a connection between the $CO_2$ sequestration plant and the export gas line, adding at least one part of tail gas from the $CO_2$ sequestration plant to the export gas upstream of the gas turbine.

10. The plant as claimed in claim 9,
further comprising an export gas container collecting the export gas upstream of the gas turbine,
wherein the connection between the $CO_2$ sequestration plant and the export gas line is upstream of the export gas container, and
wherein the measuring instrument is provided after the export gas container.

11. The plant as claimed in claim 10, further comprising a buffer container provided after the export gas container and before the gas turbine.

12. The plant as claimed in claim 11, further comprising at least one fuel supply line supplying gaseous fuel at least one of before and after the buffer container.

13. The plant as claimed in claim 12, further comprising at least one gas supply line supplying non-combustible gas at least one of before and after the buffer container.

14. The plant as claimed in claim 13,
wherein the pig iron production plant produces the export gas and has a smelter gas distribution network, and
wherein the plant further comprises a tail gas line supplying a remaining part of the tail gas, not added to the export gas, to the smelter gas distribution network.

15. The plant as claimed in claim 14, wherein the smelter gas distribution network is a furnace gas distribution network.

16. The plant as claimed in claim 13,
wherein the pig iron production plant produces the export gas, and
wherein the plant further comprises a tail gas line supplying a remaining part of the tail gas, not added to the export gas, to a hot flare.

17. The plant as claimed in claim 13, wherein the at least one export gas line includes at least one of
a top gas line from an oxygen blast furnace having top gas recirculation,
a smelter gasifier offgas line from a smelting gasifier of a smelting reduction plant,
a reduction offgas line from at least one of a reduction reactor and a reduction shaft of the smelting reduction plant,
a reactor offgas line from at least one fixed bed reactor heating and reducing iron oxides and/or compacted iron in the smelting reduction plant, and
a synthesis gas line from the synthesis gas production plant.

* * * * *

UNITED STATES PATENT AND TRADEMARK OFFICE
CERTIFICATE OF CORRECTION

PATENT NO. : 9,222,042 B2  
APPLICATION NO. : 14/005766  
DATED : December 29, 2015  
INVENTOR(S) : Robert Millner et al.

Page 1 of 1

It is certified that error appears in the above-identified patent and that said Letters Patent is hereby corrected as shown below:

On the title page, item 22  
Column 1 (PCT Filed), Line 1  
Delete "Aug. 3, 2012" and insert -- Mar. 8, 2012 --, therefor.

Signed and Sealed this  
Thirty-first Day of May, 2016

Michelle K. Lee  
*Director of the United States Patent and Trademark Office*